Feb. 4, 1964 A. ZAHNER 3,120,356

MAGNETIC TAPE RECORDER

Filed March 13, 1961 4 Sheets-Sheet 1

INVENTOR

ADRIEN ZAHNER

BY Irwin S. Thompson

ATTY.

INVENTOR
ADRIEN ZAHNER
BY Irwin S. Thompson
ATTY.

INVENTOR
ADRIEN ZAHNER
BY Irwin S. Thompson
ATTY.

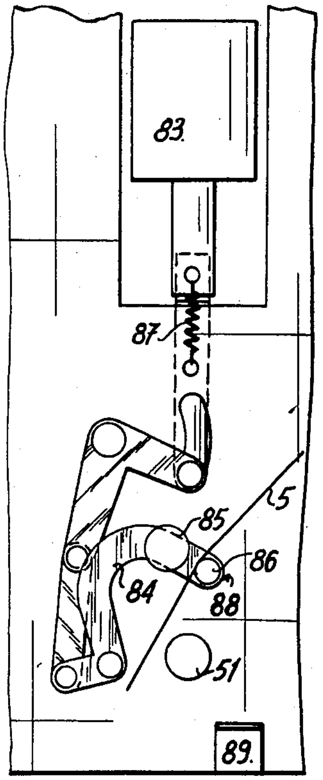
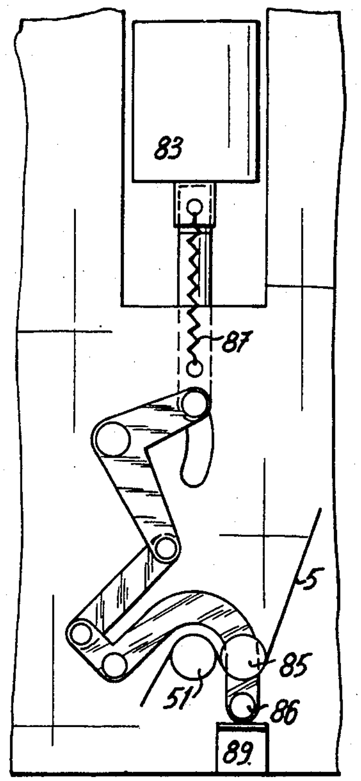
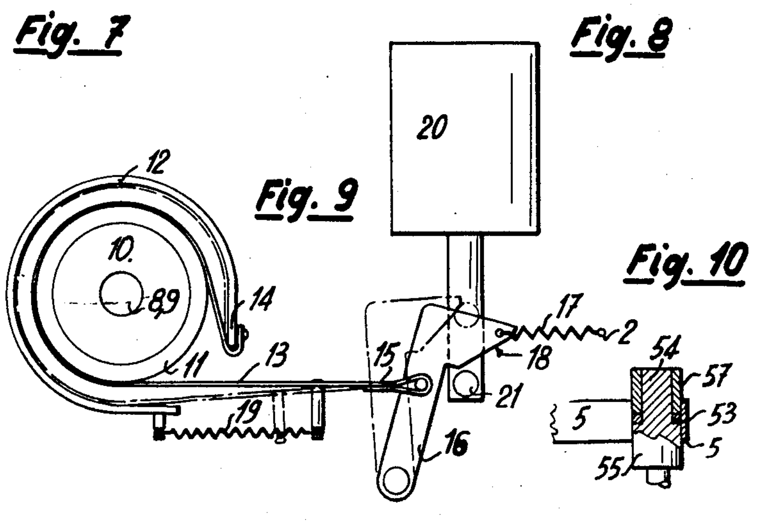
Fig. 7, Fig. 8, Fig. 9, Fig. 10
INVENTOR
ADRIEN ZAHNER
BY Irwin S. Thompson
ATTY.

United States Patent Office 3,120,356
Patented Feb. 4, 1964

3,120,356
MAGNETIC TAPE RECORDER

Adrien Zahner, Prilly, Vaud, Switzerland, assignor to Thorens S.A., Sainte-Croix, Vaud, Switzerland, a corporation of Switzerland
Filed Mar. 13, 1961, Ser. No. 95,084
Claims priority, application France Mar. 14, 1960
19 Claims. (Cl. 242—55.12)

The aim of the present invention is to enable the realization of a relatively cheap magnetophone, one which nevertheless corresponds to professional standards. This magnetophone incorporates several simple and wear resistant devices according to the invention.

The present invention has for its object a magnetophone provided with an actuating device for a magnetic tape, comprising a delivering spool and a receiving spool for said magnetic tape, a traction motor mechanically connected to each of said spools, as well as a capstan driven in rotation by means of a driving motor, which magnetophone differentiates from the known magnetophones by the fact that the magnetic tape, while being driven by the capstan, is in contact with the latter along a winding arc of sufficient length to ensure driving of said magnetic tape without sliding by means of said capstan under the effect of the pressure exerted by said tape on said capstan only.

The annexed drawing shows schematically and by way of example a magnetophone provided with a magnetic tape actuating device according to the invention.

FIG. 7 is a plan view of the device applying the magnetic tape to the capstan in its rest position.

FIG. 8 is a plan view of the device for applying the magnetic tape in its service position.

FIG. 9 is a plan view of a quick braking device for stopping the spool.

FIG. 10 is a partial axial section of a variant of a capstan according to the present invention.

Figure 1:
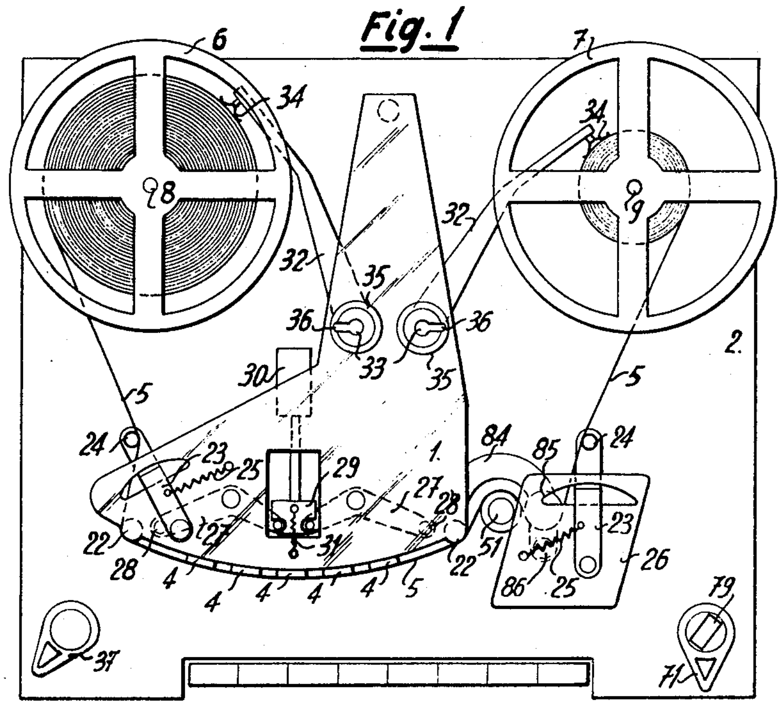
FIG. 1 is a plan view of the magnetophone in a registering or repeating position.

With reference to the annexed drawing, the magnetic tape recorder, according to the present invention, comprises a frame formed by a top plate 1, a middle plate 2, and a lower plate 3. Each of said plates is rigidly mounted on the others, at distances fixed through the construction by means of tie-rods (not shown).

Magnetic heads 4, five in number, are mounted on the middle plate 2 along an arc of a circle. Each of said magnetic heads has its own function, such as registering, reading, or erasing of one or the other of the tracks of a magnetic tape 5. Their connection with the electronic system (not shown) of the magnetophone corresponds to the given function of each of said magnetic heads.

The illustrated magnetophone is provided with an actuating device for the magnetic tape 5, which comprises a transfer device, a tension regulating device and a driving device for said magnetic tape 5.

1. *Transfer Device for the Magnetic Tape*

This transfer device comprises a translation device, a driving path, and a deviation device.

(*a*) The translation device comprises two spools, one delivering and the other receiving said magnetic tape 5 on which it winds up. Each of said spools is removably mounted on a driving shaft 8, 9 of an asynchronous motor $M_1$, $M_2$, the motors revolving in opposite directions. These asynchronous motors $M_1$, $M_2$ are fixed on the frame, and their driving moments may be adjusted, within regulating limits, by means of a tape tension regulating device which serves to control the working voltage of these motors $M_1$, $M_2$.

This translation device further comprises two quick braking devices (illustrated at FIG. 9) mounted on the shafts 8, 9 respectively. Each of said quick braking devices is constituted by a drum 10 carried by the corresponding driving shaft and provided with a coating 11 made of a material having a high friction coefficient of practically constant value such as, for example, the material designated as "ferrodo" on the market. A protector is formed by a cylindrical sector 12, co-axial with the driving shaft 8, 9, which has an inside diameter greater than the outside diameter of the coating 11 of the drum 10. This protector is rigidly fixed on the middle plate 2. A blade spring 13, having a width practically equal to that of the coating 11, is rigidly fixed, for example by means of rivets, on one of the extremities 14 of the protector 12. This blade spring 13 is wound in the inside of protecting sector 12 and surrounds the drum 10 on an arc of approximately 270°. The free extremity 15 of the blade spring 13 emerges from the protector through an aperture and is fixed on a lever 16, for example by means of a pin. This lever 16 is pivoted at one of its extremities on the middle plate 2; its other extremity, connected by means of a braking spring 17 to the plate 2, includes a bench 18, co-operating with an actuating member of the quick braking device. The free extremity 15 of the blade spring 13 is connected by means of a return spring 19 to the protector 12; this return spring is, however, weaker than the braking spring 17.

The actuating member for the quick braking device is constituted by an electro-magnet 20, the plunger of which is provided with a pin 21, co-operating with the bench 18 of the lever 16.

When the electro-magnet 20 is not energized, its plunger occupies the position shown in full lines on FIG. 9. The lever 16, subjected to the action of the braking spring 17, stronger than the return spring 19, accupies the position illustrated in full lines corresponding to the service position of the quick braking device. In fact, under these conditions the blade spring 13 is strongly applied against the coating 11 of the drum 10, causing the braking of the driving shaft. In order to free the brake, it is sufficient to apply an exciting voltage to the electro-magnet 20; its plunger displaces the lever 16, against the action of the braking spring 17 through the intermediary of the pin 21 co-operating with the bench 18, from its service position to a rest position illustrated in dotted lines on the FIG. 9. In that rest position, the blade spring 13 is applied against the inside surface of the protector 12 by means of the return spring 19, thus freeing the drum 10 and the driving shaft. The clearance between the protector 12 and the coating of the drum 10 may be kept very low; the rest position of the blade spring 13 is thus situated in the immediate vicinity of its braking position without any risk of ill-timed contact wth the coating to be feared. This braking device is thus susceptible to a very quick and precise action.

(*b*) The driving path of the magnetic tape 5 between the delivering and receiving spools of the transfer device is constituted by a series of magnetic heads 4, disposed along an arc of circle, by rollers 22 located on either side of these magnetic heads 4 and disposed between the middle plate 2 and the top plate 1, and by two stretchers located on either side of said rollers 22.

Each of said stretchers is constituted by an arm 23 carrying at one of its extremities a roller 24 intended to cooperate with the magnetic tape 5 each arm 23 being subjected to the action of a return spring 25. One of these stretchers is pivoted on the top plate 1, whereas the other is pivoted on a plate 26 located in the plane of the top plate 1 and rigidly fixed to the middle plate 2.

(*c*) The deviation device of the magnetic tape comprises two levers 27, having the general shape of an L, pivoted on the top plate 1 at the intersection of their two branches and comprising at one of their extremities a roller 28 intended to co-operate with the magnetic tape, whereas their other extremity is articulated on a mobile part 29 connected to the plunger of an electro-magnet 30. This mobile part 29 is kept in rest position when the electro-magnet 30 is not energized through the action of a spring 31 connecting mobile part 29 to the top plate 1.

Figure 2:
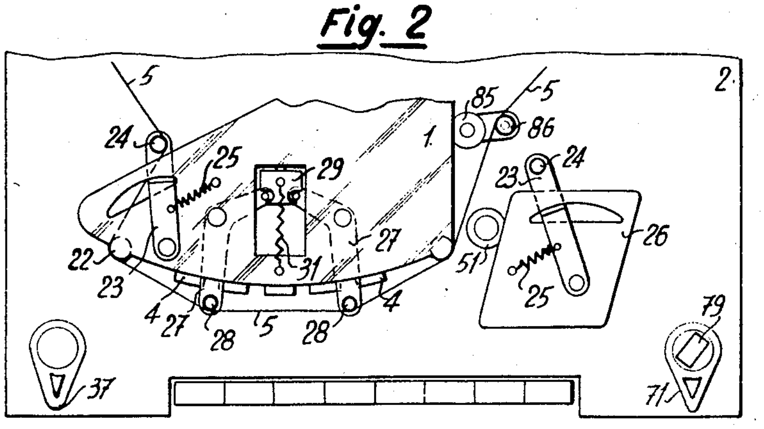
FIG. 2 is a partial plan view of the magnetophone in rest or re-wind position.

In service position, illustrated in FIG. 1, the deviation device does not co-operate with the magnetic tape 5, whereas in the rest position illustrated in FIG. 2, the mobile part 29 is attracted against the action of the spring 31 through the electro-magnet 30 which is energized, thus causing the pivoting of the levers 27, the rollers 28 of which come in contact with the magnetic tape and disengage it from the series of magnetic heads.

2. *Regulating Device for Regulating the Tension of the Magnetic Tape*

This device comprises detection members, a regulating device actuated by these detection members, a device controlling the detection members, and a device for locking the detection members.

(*a*) The detection members measure, during the working of the tape recorder, the external diameter of the magnetic tape wound on each of the spools 6, 7.

Each of said detection members is constituted by an arm 32, one extremity of which is rigidly mounted on an axle 33, pivoted on the top plate 1. The free extremity of this arm 32 is provided with a feeler 34 intended to co-operate with the surface of the magnetic tape wound on the corresponding spool. This feeler 34 is constituted by a polished blade spring, for example, and is displaceable along an arc passing through the revolving axis of the corresponding spool.

(*b*) The regulating device is constituted by two potentiometers 35, the mobile members 36 of which are each mounted on a respective one of the shafts 33 of the feeler. Each of said potentiometers is connected in series in the supply circuit of one of the traction motors $M_1$ or $M_2$. In this way it is possible to vary the value of the supply voltage of these traction motors as a function of the diameter of the tape wound on the corresponding spool.

Figure 5:
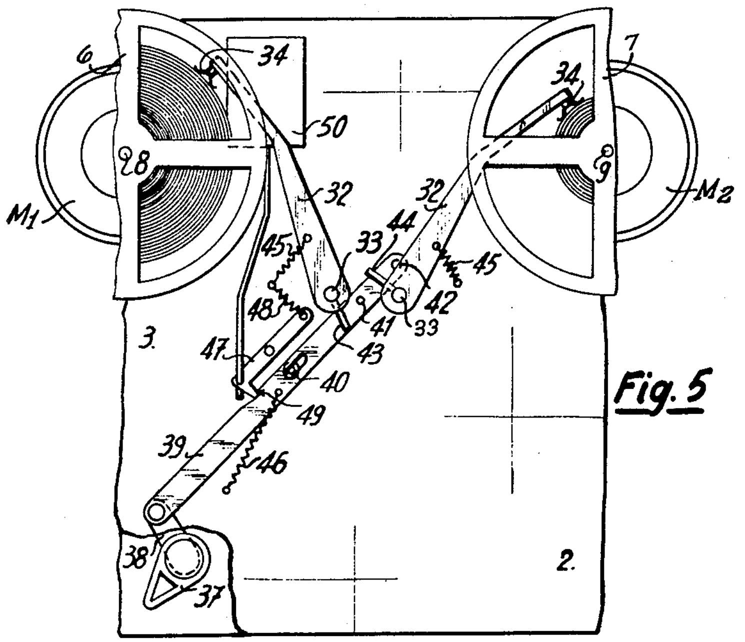
FIG. 5 is a plan view of the device for regulating the tension of the magnetic tape, shown in its service position.
Figure 6:
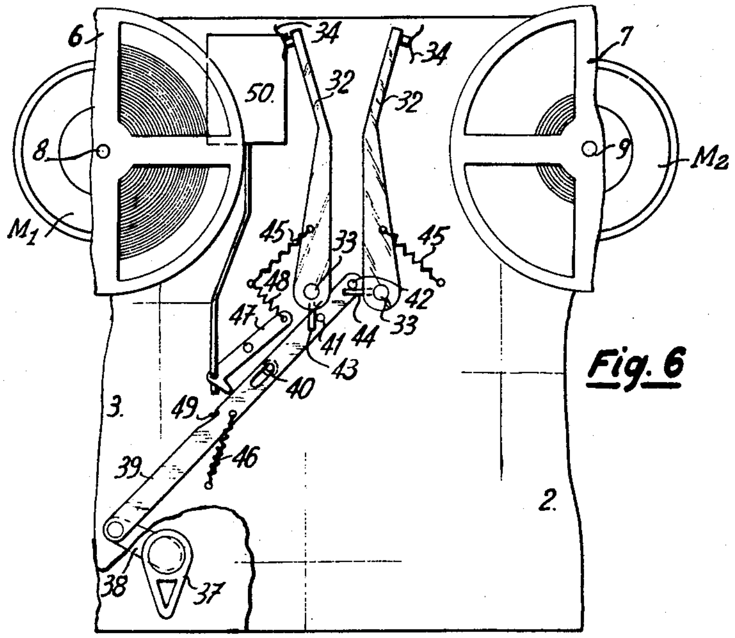
FIG. 6 is a plan view of the regulating device, this view being of the rest position.

(*c*) The control device of the detection members illustrated in more detail in FIGS. 5 and 6 comprises firstly a manual control constituted by a knob 37, provided with an eccentric 38, connected to a control rod 39. This control rod is fixed under the middle plate 2 by means of a pin 40 fast on the plate 2, sliding in a slot provided in the control rod. This control rod 39 comprises at its free extremity two pins 41, 42 each cooperating with a finger 43, 44, carried by the axle 33 of each of said arms 32. Springs 45 are connected to arms 32 and to maintain them in the service position illustrated in FIG. 5, for which the feelers 34 are in contact with the magnetic tape wound on the spools. However, the control rod 39 is subjected to the action of the spring 46, tending to maintain it in such a position (FIG. 6) that the detection members are maintained, through the intermediary of the pins 41, 42 and the fingers 43, 44, in a rest or removed position against the action of their springs 45.

(*d*) The device which releasably locks the detection members in their service position comprises an electro-magnet 50, the plunger of which is mechanically connected at one extremity of a pawl 47, pivoted around its centre on the middle plate 2. The other extremity of said pawl 47 is biased by a spring 48. The extremity of the pawl 47, which is connected to the the plunger of the electro-magnet 50, co-operates with a flat 49 provided on the edge of the control rod 39.

3. *Driving Device for the Magnetic Tape*

This device comprises a capstan, a device for driving the capstan in rotation, and a device for applying the magnetic tape on the capstan.

(*a*) The capstan is constituted by a metallic cylinder 51, the outside surface of which is rectified, so as to be perfectly concentric with a driving shaft 52 on which this cylinder is fixed. The surface of the metallic cylinder is rendered sufficiently rough by sand blasting in order to ensure a good friction coefficient with the magnetic tape.

The capstan could comprise a rubber coating in order to increase the friction coefficient with the magnetic tape.

FIG. 10 shows a capstan presenting a rubber coating 53 of less width than that of the magentic tape and which comprises a turned portion 54 of less diameter than the base 55 on which the rubber washer and a metallic tube 57 are driven in. The whole is rectified to the diameter of the base 55.

Figures 3, 4:
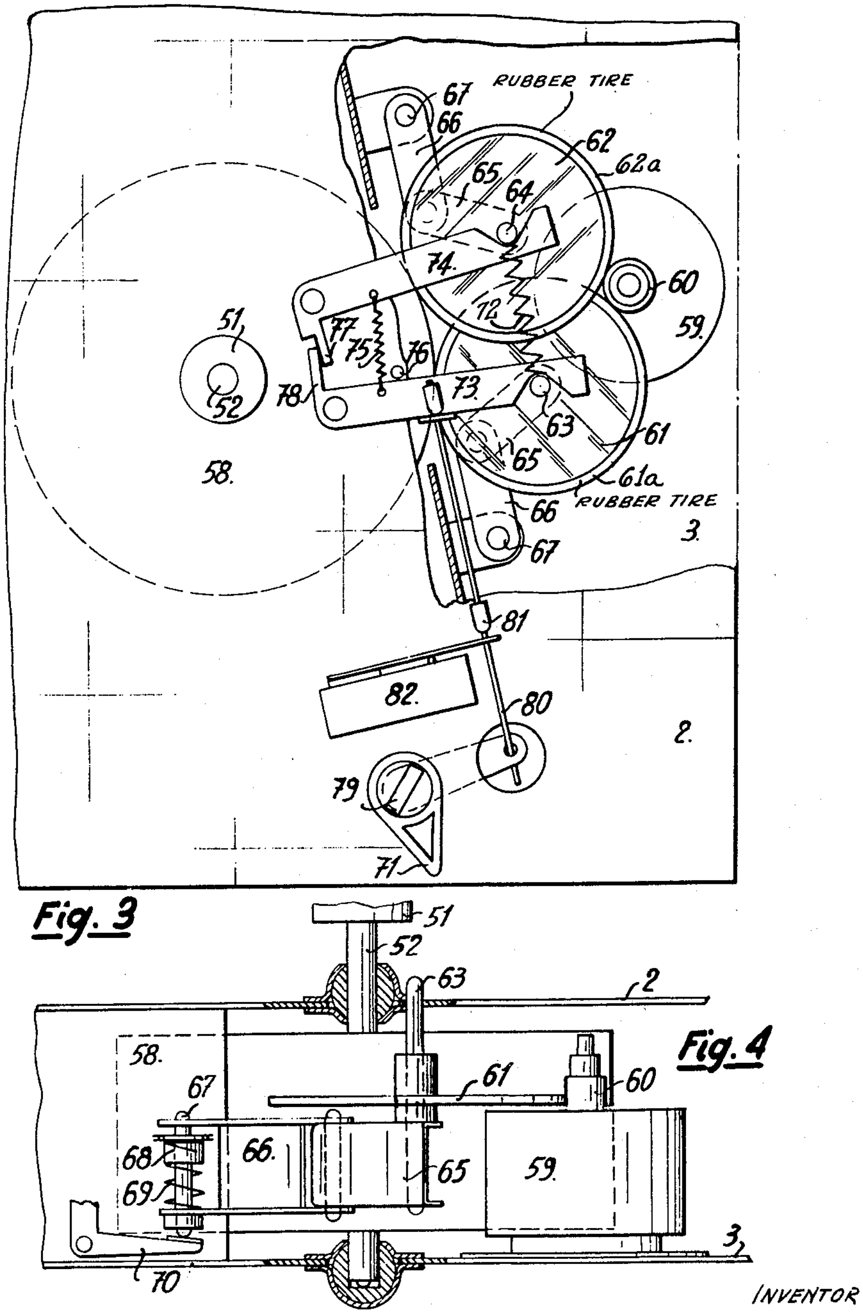
FIG. 3 is a plan view of the driving device for the capstan.
FIG. 4 is a partial view in elevation of the capstan driving device.

(*b*) The capstan driving device, illustrated in FIGS. 3 and 4, comprises the driving shaft 52 on which an inertia wheel 58 is mounted. This shaft 52 is pivoted on the one hand on the middle plate 2, and, on the other hand, on the lower plate 3.

A motor 59, preferably an asynchronous one with a reversible rotation direction, is fixed on the lower plate 3. The shaft of motor 59 is provided with a pulley 60 provided with three steps.

The driving of the inertia wheel 58 through the stepped pulley 60 is effected by friction by means of discs 61, 62 provided with rubber tires **61*a*, 62*a*. These discs revolve freely on axles 63, 64 carried each by a system comprising levers 65, 66 articulated the one with respect to the other. Each lever 66 comprises a guiding rod 67, which turns and slides in a tube 68 fast on the middle plate 2. A spring 69 tends to maintain the levers and thus the discs in a low position. Each of said guiding rods 67 bears on a cam 70 controlled by a system of levers and cams (not shown) from a knob 71, pivoted on the middle plate 2, and susceptible to occupy three different positions corresponding to three different levels of the discs 61, 62 determined in such a way that they co-operate for each of said levels with one of the three steps of the pulley 60. The height of these steps of said pulley is such that the two discs 61, 62** may co-operate simultaneously with the same step without touching each other.

A spring 72, connecting the axles 63, 64, tends to pull them together, thus ensuring the simultaneous contact of each of said discs 61, 62 with the inertia wheel 58 on the one hand, and the stepped pulley 60, on the other hand.

The relative positions of the axles 63, 64 as well as of the inertia wheel 58 and of the stepped pulley 60 are such that, according to the rotation direction of the motor 59, the one or the other of the discs is applied, under the torque to be transmitted, against the inertia wheel and the stepped pulley through a wedging effect, whereas the other disc is, on the contrary, just maintained in contact with these members. This arrangement controls the reversing of the rotation direction of the capstan at each of the three operating speeds by simple electric commutation of the motor 59.

A stretching device for the discs 61, 62 prevents these discs from resting in contact with the inertia wheel 58 and the stepped pulley 60 when the magnetophone is stopped, so as to avoid any permamnent deformation of the rubber tire of these discs. This device comprises two disengaging levers 73, 74 pivoted on the middle plate 2 and presenting notches co-operating with the upper extremities of the axles 63, 64. These two levers are connected by a spring 75 tending to bring them together into a position (FIG. 3) for which the disengaging lever 73 abuts against a pin 76 fast with the middle plate 2. The disengaging lever 74 occupies then a position which is defined by an arm 77 co-operating with an arm 78 of the lever 73. These disengaging levers may be separated one from the other, taking the axles 63, 64 of the discs with them and placing discs 61, 62 in positions such that they no longer abut with the inertia wheel or the stepped pulley, by means of a manual control device. This manual control comprises a knob 79 co-axial to the knob 71 and acting through a rod 80 on the disengaging lever 73. This rod comprises an abutment 81 co-operating with a switch 82, located in series in the supply circuit of the magnetophone. This switch 82 is in open position when the disengaging levers are separated from each other as much as possible.

(*c*) the device which applies the magnetic tape against the capstan comprises an electro-magnet 83, the plunger of which is mechanically connected through the intermediary of levers and coupling rods to a support 84 pivoted on the top plate 1 and comprising at its free extremity two rollers 85, 86 intended to co-operate with the magnetic tape 5.

This device may occupy two positions: one rest position illustrated in FIG. 7 and a working position illustrated in FIG. 8. A spring 87 tends to maintain this device in its rest position, the position for which the roller 86 deviates the magnetic tape so that it does not come in contact with the capstan 51.

When the electro-magnet 83 is energized, it displaces the support 84 from its rest position to its working position against the action of the spring 87, a position for which the magnetic tape is wound around the capstan along an arc of approximately 120°. This working position is defined by the front face 88 of the support 84 abutting against a stop 89.

This tape applying device has as its sole function the placing of the tape in contact with the capstan along a predetermined winding arc, but does not in any case exert a pressure against said tape, in order to apply it on the capstan. The tape is applied on the capstan by its own pressure, determined by its tension only.

In another embodiment (not shown), the capstan could be in contact with the side of the magnetic tape bearing the magnetic coating and not with the plastic material of said tape. In this way the tape presents a greater adherence with respect to the capstan which enables to ensure a better driving of the tape.

In such an arrangement, the magnetic heads would be located on the other side of the tape and disposed along an arc of a circle, the curvature of which would be the inverse from the one illustrated on FIG. 1.

The advantages of the magnetophone with respect to all the actually existing magnetic tape recorders are the following:

(1) As a result of the device which regulates the tension of the magnetic tape it is always subjected to the same traction. In fact, the driving moment of the traction motors is continuously adjusted as a function of the radius of the mass of the tape wound on the corresponding spool. With such a construction, it is possible to obtain an operation which is entirely satisfactory with a constant tension of the magnetic tape of the order of 100 g., which represents about one tenth of the maximum allowed tension by the professional standards. It is evident that such a decrease of the tension of the tape reduces to a large extent the elastic or permanent deformations of the tape. The quality of the reproduction is thus greatly increased through the elimination of the scintillation and of tonality change phenomenons due to the deformations of the tape.

(2) As it is possible to reduce the tension of the tape and, above all, to maintain it constant during operation, it is possible to reduce the power of the traction motors $M_1$, $M_2$ in the same ratio as the reduction of the tension. This additionally permits a reduction of the size of these motors and also a reduction of their leakage flux which is always a troublesome source of noise appearing in the electronic members of the magnetophone.

(3) The driving moment of the magnetic tape is low (it diminishes also approximately in the same ratio as the tension of the tape), which permits a reduction of the power of the capstan driving motor and consequently of its leakage flux.

This reduction of the driving moment of the tape lowers the necessary minimum friction coefficient to ensure a perfect driving of the tape through the capstan. Thanks to the considerable winding arc of the capstan around the tape realized in the described device, it has been possible to omit the usual pressing roller, which represents a very great improvement, since this pressing roller is the origin of most of the drawbacks of presently existing magnetic tape recorders.

It is even possible to use a metallic capstan, the surface of which is conveniently treated and eliminates thus all the risks of deformation with time.

(4) The lever 84 with its two rollers 85, 86 brings the tape very rapidly into contact with the rotating capstan and takes it away in the same way. Thus a practically instantaneous starting and stopping of the tape is provided.

(5) The braking devices of the delivering and receiving spools described enable, thanks to their quick and very precise action, to avoid high traction forces during the stopping of the spools revolving at great speed.

(6) The stretcher disposed on the driving path of the magnetic tape cushions these traction forces even more.

From the preceding, it is seen that with a given manufacturing precision of the different members of the actuating device, it is possible to obtain much higher reproduction qualities than those obtained actually with the magnetophones of amateur type and, above all, that these qualities are much more durable.

It is then possible to realize a professional type magnetophone at low costs.

Furthermore, the driving device described is very simple and removes all the causes of fast wear, as well as the deformations of the coating of the capstan, which always occur in the existing magnetophones, even in the professional types.

I claim:

1. A magnetophone comprising an actuating device for a magnetic tape having a delivering spool and a receiving spool for said magnetic tape, a separate traction motor mechanically coupled to each of said spools, a driving motor, a capstan driven in rotation by said driving motor, means coupling said capstan to said driving motor, said magnetic tape being, when driven by said capstan, in contact with said capstan along a winding arc of sufficient length to ensure driving of said magnetic tape by said capstan without sliding under the effect of the pressure exerted by said tape on said capstan only, in combination with means for applying said tape around the capstan, said tape applying means comprising a base plate, a support pivoted on said base plate, two rollers pivoted on one extremity of said support, said tape passing between said two rollers, actuating means for controlling the position of said support, and articulated linking means for connecting said support and said actuating means, said support being displaceable thereby from a rest position for which the magnetic tape is out of contact with the capstan into a service position for which said magnetic tape is wound around said capstan along an arc of at least 120°.

2. A magnetophone as claimed in claim 1 in which said linking means between the support and the actuating means comprises a V-shaped lever pivoted at its center portion upon said base plate, a pair of abutments mounted on said base plate, one end of said V-shaped lever being displaceable by said actuating means between said abutments, and a straight lever pivoted at one end upon the other extremity of said support and having its other end pivoted on the other end of said V-shaped lever, so that when said support is located in its rest position, the support is automatically locked in the rest position and cannot be displaced as long as the actuating means is not actuated.

3. A magnetophone as claimed in claim 1, wherein said driving motor comprises a reversible motor having two driving directions and the means coupling said capstan to said driving motor comprises a plurality of discs bearing tires made of supple and elastic material, a stepped pulley driven in rotation by said driving motor, an inertia wheel connected to said capstan, and spring means urging said discs into contact with said pulley and with said inertia wheel.

4. A magnetophone as claimed in claim 3, and including a plurality of parallel shafts, and means supporting said shafts for both horizontal and vertical displacement, said discs being freely pivoted on said shafts.

5. A magnetophone as claimed in claim 4 in which said inertia wheel and said stepped pulley have relative positions such that according to the direction of rotation of said driving motor, the one or the other of said discs is automatically applied under the torque to be transmitted against the inertia wheel and the stepped pulley by a wedging effect.

6. A magnetic tape applying means for a magnetophone for the like comprising, in combination, a magnetic tape, a driving motor, a capstan mounted on a base plate and driven by said driving motor, an electromagnet mounted on said base plate, said electromagnet having a plunger with a radial pin located at its outer end, a slot in said base plate through which said pin extends, spring means for maintaining said plunger in a rest position with the pin at one end of said slot when said electromagnet is not energized, a V-shaped lever pivoted at its center portion upon said base plate and having a first extremity connected to said pin, a curved support member pivoted on said base plate, a pair of rollers mounted on one end of said support member, said magnetic tape passing between said rollers, and a straight lever connecting a second extremity of said V-shaped lever to the other end of said support member, said support member being automatically locked by said levers in a rest position with the magnetic tape removed from the capstan while said electromagnet is not energized, said support member being displaced by said levers to a service position in which said magnetic tape is wound around said capstan along an arc of at least 120° only upon energizing said electromagnet, said tape thereupon contacting the capstan without slipping under the effect solely of the pressure exerted by said tape upon said capstan.

7. In a magnetophone, a driving motor, a capstan driven by said motor, and means for selectively applying a magnetic tape to said capstan, said tape applying means comprising: an electromagnetic actuating means mounted on a base plate, first and second abutment means located on said base plate, spring means for normally retaining said actuating means in a predetermined position against said first abutment means, a V-shaped lever pivotally mounted on said base plate, one arm of said V-shaped lever connected to said actuating means, a curved support pivotally mounted on said plate, two rollers mounted for rotation on one end of said support, said magnetic tape passing between the rollers, and a straight lever connected between the other arm of said V-shaped lever and the remaining end of said support so that said support is automatically locked in a position maintaining said tape away from said capstan until energization of said electromagnetic actuating means moves said one arm against said second abutment means and thereby displaces said support to a service position in which said tape is wound around said capstan through an arc of substantially 120° or more.

8. A magnetophone comprising an actuating device for a magnetic tape having a delivering spool and a receiving spool for said magnetic tape, a separate traction motor for each of said spools, shafts mechanically coupling each of said traction motors to the corresponding spool, a driving motor, a capstan driven in rotation by said driving motor, means coupling said capstan to said driving motor, said magnetic tape being, when driven by said capstan, in contact with said capstan along a winding arc of sufficient length to ensure driving of said magnetic tape by said capstan without sliding under the effect of the pressure exerted by said tape on said capstan only, means for applying said tape around the capstan, said tape applying means comprising a base plate, a support pivoted on said base plate, two rollers pivoted on one extremity of said support, said tape passing between said two rollers, actuating means for controlling the position of said support, articulated linking means for connecting said support and said actuating means, said support being displaceable thereby from a rest position for which the magnetic tape is out of contact with the capstan into a service position for which said magnetic tape is wound around said capstan along an arc of at least 120°, and a quick braking means mounted on each of said shafts and comprising a protector means, a drum mounted within said protector means upon the corresponding shaft, and a blade spring disposed between said drum and said protector means, said blade spring being arranged to occupy one of two positions, a first, service position wherein it is in contact with a portion of the peripheral surface of said drum and a second, rest position wherein it bears against the inside surface of said protector means.

9. A magnetophone as claimed in claim 8, in which said drum is provided with a surface coating comprising a material having a high and constant coefficient of friction.

10. A magnetophone as claimed in claim 8, in which said protector means is formed by a wall concentric with said drum, said wall containing an aperture giving passage to the free extremity of said blade spring.

11. A magnetophone as claimed in claim 10, comprising further a control means connected to said free extremity of the blade spring, its remaining extremity being rigidly connected to said protector means.

12. A magnetophone comprising an actuating device for a magnetic tape having a delivering spool and a receiving spool for said magnetic tape, a separate traction motor mechanically coupled to each of said spools, a driving motor, a capstan driven in rotation by said driving motor, means coupling said capstan to said driving motor, said magnetic tape being, when driven by said capstan, in contact with said capstan along a winding arc of sufficient length to ensure driving of said magnetic tape by said capstan without sliding under the effect of the pressure exerted by said tape on said capstan only, in combination with means for applying said tape around the capstan, said tape applying means comprising a base plate, a support pivoted on said base plate, two members mounted on one extremity of said support, said tape passing between said members, actuating means for controlling the position of said support, and articulated linking means for connecting said support and said actuating means, said support being displaceable thereby from a rest position for which the magnetic tape is held out of contact with the capstan into a service position for which said magnetic tape is wound around said capstan along an arc of at least 120°.

13. A magnetophone comprising an actuating device for a magnetic tape having a delivering spool and a receiving spool for said magnetic tape, a separate traction motor mechanically coupled to each of said spools, a driving motor, a capstan driven in rotation by said driving motor, means coupling said capstan to said driving motor, said magnetic tape being, when driven by said capstan, in contact with said capstan along a winding arc of sufficient length to ensure driving of said magnetic tape by said capstan without sliding under the effect of the pressure exerted by said tape on said capstan only, in combination with means for applying said tape around the capstan, said tape applying means comprising a base plate, a support pivoted on said base plate, two guiding members mounted on one extremity of said support, said tape passing between said two guiding members, actuating means for controlling the position of said support, and articulated linking means for connecting said support and said actuating means, said support being displaceable thereby from a rest position for which the magnetic tape is held out of contact with the capstan by means of one of said guiding members into a service position for which said magnetic tape is wound around said capstan along an arc of at least 120° by means of the other of said guiding members.

14. A magnetophone comprising an actuating device for a magnetic tape having a delivering spool and a receiving spool for said magnetic tape, a separate traction motor mechanically coupled to each of said spools, a driving motor, a capstan driven in rotation by said driving motor, means coupling said capstan to said driving motor, in which said driving motor comprises a reversible motor having two driving directions and the means coupling said capstan to said driving motor comprises a plurality of discs bearing tires made of supple and elastic material, a stepped pulley driven in rotation by said driving motor, an inertia wheel connected to said capstan and spring means urging said discs into contact with said pulley and with said inertia wheel.

15. A magnetophone comprising an actuating device for a magnetic tape having a delivering spool and a receiving spool for said magnetic tape, a separate traction motor mechanically coupled to each of said spools, a driving motor, a capstan driven in rotation by said driving motor, means coupling said capstan to said driving motor, in which said driving motor comprises a reversible motor having two driving directions and the means coupling said capstan to said driving motor comprises a plurality of discs bearing tires made of supple and elastic material, a plurality of parallel shafts, and means supporting said shafts for both horizontal and vertical displacements, said discs being freely pivoted on said shafts, a stepped pulley driven in rotation by said driving motor, an inertia wheel connected to said capstan and spring means urging said discs into contact with said pulley and with said inertia wheel.

16. A magnetophone as claimed in claim 15 wherein said inertia wheel and said stepped pulley have rotative positions such that according to the directions of rotation of said driving motor, the one or the other of said discs is automatically applied under the torque to be transmitted against the inertia wheel and the stepped pulley by a wedging effect.

17. A magnetophone comprising an actuating device for a magnetic tape having a delivering spool and a receiving spool for said magnetic tape, a separate traction motor for each of said spools, shafts mechanically coupling each of said traction motors to the corresponding spool, a driving motor, a capstan driven in rotation by said driving motor, means coupling said capstan to said driving motor, and quick braking means mounted on said shafts of said spools, each of said quick braking means comprising a drum connected to a spool, a protector means, and a blade spring adapted to occupy two positions, a first, service position for which it is in contact with a portion of the peripheral surface of said drum and a second, rest position for which it bears on the inside surface of said protector means.

18. A magnetophone comprising an actuating device for a magnetic tape having a delivering spool and a receiving spool for said magnetic tape, a separate traction motor for each of said spools, shafts mechanically coupling each of said traction motors to the corresponding spool, a driving motor, a capstan driven in rotation by said driving motor, means coupling said capstan to said driving motor, and quick braking means mounted on said shafts of said spools, each of said quick braking means comprising a drum connected to a spool, a coating made of a material having a high and constant friction coefficient provided on said drum, a protector means, and a blade spring adapted to ocupy two positions, a first, service position for which it is in contact with a portion of the peripheral surface of said drum and a second, rest position for which it bears on the inside surface of said protector means.

19. A magnetophone comprising an actuating device for a magnetic tape having a base plate, a delivering spool and a receiving spool for said magnetic tape, a separate traction motor for each of said spools, shafts mechanically coupling each of said traction motors to the corresponding spool, a driving motor, a capstan driven in rotation by said driving motor, means coupling said capstan to said driving motor, and quick braking means mounted on said shafts of said spools, each of said quick braking means comprising a drum connected to a spool, a protector means rigidly connected to said base plate, and a blade spring adapted to occupy two positions, a first, service position for which it is in contact with a portion of the peripheral surface of said drum and a second, rest position for which it bears on the inside surface of said protector means, said protector means being formed by a wall concentric with said drum, said wall having an aperture giving passage to the free end of said blade spring, a control means connected to said free extremity of said blade spring, and means for rigidly connecting the other extremity of said blade spring to said protector means.

References Cited in the file of this patent

UNITED STATES PATENTS

| | | |
|---|---|---|
| 2,365,691 | Fodor | Dec. 26, 1944 |
| 2,597,176 | Pettus | May 20, 1952 |
| 2,675,973 | Reed et al. | Apr. 20, 1954 |
| 2,686,637 | Dashiell et al. | Aug. 17, 1954 |
| 2,920,148 | Munroe | Jan. 5, 1960 |